Patented Nov. 24, 1931

1,833,680

UNITED STATES PATENT OFFICE

OSCAR KASELITZ AND FRITZ POHLE, OF BERLIN, GERMANY

MIXED FERTILIZER

No Drawing. Application filed February 16, 1931, Serial No. 516,211, and in Germany February 20, 1930.

Our invention refers to fertilizers and more especially to means for producing mixed fertilizers containing nitrogen, phosphoric acid and potash. It is an object of our invention to provide means for producing fertilizers of this kind in a more efficient manner than was hitherto possible.

It is known to decompose crude phosphates with nitric acid and to convert the calcium nitrate, which forms in the reaction, into calcium sulfate and alkali nitrate by adding alkali sulfate.

When using the commercial 50% nitric acid, decomposition to form monocalcium phosphate results in a smeary sludge; when producing free phosphoric acid, an almost fluid product is formed. The conversion of these products into a dry fertilizer product in the apparatuses available in the factories is connected with great difficulties.

We have now found that these drawbacks can be done away with by operating substantially as follows:

We first mix the nitric acid with the alkali sulfate and then add this mixture under stirring as quickly as possible to the finely powdered crude phosphate. The reaction temperature varies between 50–60° C. and the mass remains at first fluid. Before it begins thickening, we add a certain quantity (up to 50%) of dried final product obtained in a prior operation. After the reaction has come to an end a solid, brittle, lumpy mass is obtained which can be conveyed in the usual conveyers and dried in the usual drying apparatus.

We may also proceed in such manner that we make the addition of final product to the crude phosphate or to the nitric acid before starting the process.

The process can be carried out in the apparatus available in superphosphate factories. After drying a strewable fertilizer product is obtained which can be stored an indefinite time.

Example.—100 kgs. crude phosphate containing 76.4% $Ca_3(PO_4)_2$ are mixed with 50 kgs. of the final product obtained in a prior operation and to the mixture are now quickly added under stirring 120 kgs. potassium sulfate and 132 litres of a 50% nitric acid. The reaction mixture is allowed to stand several hours in a decomposition vessel, the water vapor developed being sucked off. After drying there results a fertilizer product which is absolutely dry, strewable and fit for storage and which contains 5.4% N, 9.7% $P_2O_5$ and 22.9% $K_2O$. A corresponding portion of this product can be added to the phosphate or to the nitric acid or to the reaction mixture in a succeeding operation.

If it is desired to obtain a product somewhat poorer in potash and richer in nitrogen, part of the potassium sulfate may be replaced by ammonium sulfate.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. The method of producing a mixed fertilizer comprising mixing an alkali sulfate with nitric acid, finely powdered raw phosphate and a quantity of the dry final product obtained in a preceding operation, which suffices to convert the product of decomposition into a solid crumbling mass.

2. The method of producing a mixed fertilizer comprising dissolving alkali sulfate in nitric acid, quickly admixing the solution thus obtained with finely powdered raw phosphate and at the same time adding a quantity of the dry final product obtained in a previous operation, which suffices to convert the product of decomposition into a solid crumbling mass.

3. The method of producing a mixed fertilizer comprising dissolving a mixture of potassium and ammonium sulfate in nitric acid, quickly admixing the solution thus obtained with finely powdered raw phosphate and at the same time adding a quantity of the dry final product obtained in a previous operation, which suffices to convert the product of decomposition into a solid crumbling mass.

In testimony whereof we affix our signatures.

OSCAR KASELITZ.
FRITZ POHLE.